United States Patent Office 3,637,553
Patented Jan. 25, 1972

3,637,553
PRODUCTION OF HOMOGENEOUS, THERMO-
PLASTIC, AND HIGHLY ELASTIC PLASTICS
FROM VINYL CHLORIDE POLYMERS AND
POLYURETHANES
Wolfgang Keberle, Leverkusen, and Wilhelm Göbel,
Cologne-Flittard, Germany, assignors to Farbenfabriken Bayer Aktiengesellschaft, Leverkusen, Germany
No Drawing. Filed Sept. 24, 1969, Ser. No. 860,810
Claims priority, application Germany, Oct. 11, 1968,
P 18 02 471.0
Int. Cl. C08f 45/24; C08g 41/04
U.S. Cl. 260—23
9 Claims

ABSTRACT OF THE DISCLOSURE

Polyvinyl chloride stabilizers are readily and acceptably introduced into vinyl or vinylidene chloride polymer/polyurethane mixtures by using polyurethane dispersions containing polyvinyl chloride stabilizers either in solution or in fine distribution in the discrete polyurethane dispersion particles to prepare the vinyl chloride polymer/polyurethane plastics mixtures from vinyl chloride polymer dispersions and polyurethane dispersions, by admixture and co-coagulation.

---

This invention relates to stabilized homogeneous thermoplastic and highly elastic plastics and to a process for preparing the same.

It has been heretofore known that homogeneous plastics can be obtained from vinyl chloride polymers, for example, polyvinyl chloride, and polyurethanes by rolling polyurethanes into vinyl chloride polymers. It has also been known that aqueous dispersions of vinyl chloride polymers and polyurethanes can be mixed together. The resulting latex mixtures are subsequently coagulated and the dried co-coagulates processed in molds. In order to stabilize these mixtures of plastics, it is necessary, in practice, to roll in polyvinyl chloride stabilizers at elevated temperature before processing in molds. This involves an additional thermal strain upon the vinyl chloride polymer-polyurethane mixtures which detrimentally affects the range of properties of these plastics.

It is, therefore, an object of this invention to provide homogeneous, thermoplastic, highly elastic plastics from vinyl chloride polymers and polyurethanes and a process for producing the same without the foregoing disadvantages and problems. A further object of this invention is to provide a process for producing such plastic compositions containing polyvinyl chloride stabilizers. An additional object of this invention is to provide a process for incorporating polyvinyl chloride stabilizers into homogeneous, thermoplastic, highly elastic plastics from polyvinyl chloride polymers and polyurethanes without detrimentally affecting the properties of the plastic compositions.

The foregoing objects and others which will become apparent from the following description are accomplished, generally speaking, by a process wherein polyvinyl chloride stabilizers are readily and acceptably introduced into vinyl or vinylidene chloride polymer/polyurethane mixtures by using polyurethane dispersions containing polyvinyl chloride stabilizers either in solution or in fine distribution in the discrete polyurethane dispersion particles to prepare the vinyl chloride polymer/polyurethane plastics mixtures from vinyl chloride polymer dispersions and polyurethane dispersions, by admixture and co-coagulation. After the mixture has been coagulated and the coagulate has been dried, the homogeneous vinyl chloride polymer/polyurethane mixture may be directly processed in molds without the heretofore encountered problems.

It is an advantage of this invention that, through simple and thorough admixture of the dispersions, and co-coagulation of the dispersion mixture, homogeneous plastics mixtures are obtained in which the stabilizers are present in particularly uniform and homogeneous distribution either in solution or in fine dispersion.

Accordingly, this invention relates to a process for the production of homogeneous, thermoplastic and highly elastic plastics containing polyvinyl chloride stabilizers, which comprises mixing an aqueous vinyl or vinylidene chloride polymer dispersion with an aqueous dispersion of a polyurethane derived from a relatively high molecular weight polyhydroxyl compound with a molecular weight of from about 400 to about 4000, an aliphatic or araliphatic polyisocyanate and optionally a chain-extender with reactive hydrogen atoms, followed by coagulation and forming, wherein the polyurethane dispersion contains one or more polyvinyl chloride stabilizers in solution or in fine distribution in the dispersed polyurethane.

The polyurethane dispersions containing the polyvinyl chloride stabilizers, either in solution or in fine distribution in the dispersed phase, used in accordance with the invention, are those prepared from the relatively high molecular weight polyhydroxyl compounds having molecular weights of from 400 to 4000, and preferably from about 800 to about 2500, commonly used in the preparation of polyurethane dispersions. Examples of suitable polyhydroxyl compounds include hydroxyl-containing polyesters, polyethers, polythioethers, polycarbonates, polyacetals, polyesteramides and polylactones.

Any suitable hydroxyl polyester may be used for the preparation of the polyurethane dispersions such as those prepared from dihydric alcohols and dicarboxylic acids. Any suitable dicarboxylic acid may be used such as adipic acid, methyl adipic acid, glutaric acid, succinic acid, azelaic acid, sebacic acid, nonane-dicarboxylic aid, thiodiproponic acid, pimelic acid, suberic acid, fumaric acid, maleic acid, phthalic acid, terephthalic acid, isophthalic acid, hexahydroterephthalic acid and the like. Any suitable dihydric alcohol may be used such as, for example, ethylene glycol, 1,3-propylene diol, dimethyl propane-1,3-diol, 1,4-butanediol, 1,6-hexanediol, 2,5-hexanediol, methylhexanediol, 1,10-decanediol, thiodiglycol, diethylene glycol, triethylene glycol, 4,4′-dihydroxy dicyclohexyl dimethyl methane, N-methyl diethanolamine, bis-oxymethyl cyclohexane, phenylene-1,4-bishydroxyethyl ether, trimethylol propane and the like. Further suitable polyesters can be obtained from caprolactones and glycols such as 1,4-butanediol.

Any suitable polyester amide may be used such as those prepared by the incorporation of amino alcohols, amino carboxylic acids and polyamines into the formulations for hydroxyl polyesters set forth above. Any suitable amino alcohols such as, for example, ethanol amine, propanol amine and the like may be used. Any suitable polyamine such as, for example, toluylene diamine, hexanediamine, piperazine, and the like may be used. Any suitable amino carboxylic acid such as, for example ω-amino caproic acid and ω-amino undecanoic acid and the like may be used. Specific polyester amides includes, for example, adipic acid, diethanolamide acid, terephthalic acid, bis-N-methylpropanol amide and the like.

Any suitable polyalkylene ether may be used in the preparation of polyurethane dispersions in accordance with this invention such as the reaction product of any of the above-mentioned polyhydric alcohols with alkylene oxides such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. The polyhydric polyalkylene ethers may be prepared by any known process such as, for example, the process disclosed by Wurtz in 1859 and in "Encyclopedia of Chemical Technology," vol. 7, pp. 257–262, published by Interscience Publishers, Inc. (1951) or in U.S. Pat. 1,922,459.

Any suitable polyhydric polythioether may be used such as, for example, the condensation product of a thiodiglycol or the reaction product of a polyhydric alcohol such as is disclosed above for the preparation of the hydroxyl polyesters with any other suitable thioether glycol. Other suitable polyhydric polythioethers are disclosed in U.S. Pats. 2,862,972 and 2,900,368.

Any suitable polyacetal may be used such as, for example, the reaction product prepared by reacting an aldehyde with a polyhydric alcohol. Any of the polyhydric alcohols mentioned above may be used. Any suitable aldehyde may be used such as, for example, formaldehyde, polymers of formaldehyde, acetaldehyde, butyraldehyde and the like. The polyacetals may further be prepared by reacting long chain polyhydric alcohols such as polyesters and polyalkylene ethers such as those mentioned above with aldehydes. Such long chain alcohols may have a molecular weight of from about 200 to about 2000. The polyacetals described in German patent specification Nos. 1,039,744 and 1,045,095 are suitable for use in the preparation of the polyurethane dispersions.

Any suitable hydroxyl-terminated polycarbonate such as, for example, those set forth in Canadian Pats. 578,585; 578,795 and 594,805 may be used. Further, the polycarbonates obtained from cyclic carbonates and glycols and those hydrocarbon polymers which contain small quantities of hydroxyl groups can likewise be used as starting materials.

Any suitable aliphatic and araliphatic isocyanates may be used in accordance with the invention and include, for example, isophorone diisocyanate; diisocyanato carboxylic acid esters such as those described, for example, in British patent specifications Nos. 1,072,956 and 965,474, 1,4-tetramethylene diisocyanate, 1,5-pentamethylene diisocyanate, 1,6-hexamethylene diisocyanate, hexahydrotolylene-2,4- and -2,6-diisocyanate and any isomeric mixtures of these isocyanates, tetrahydro- and decahydronaphthylene-1,4-diisocyanate, 1,4-cyclohexane diisocyanate, 4,4'-diphenylmethane diisocyanate and the like.

Any suitable low molecular chain-extenders with a molecular weight of less than 400, may optionally be used for the preparation of the polyurethane dispersion and include, for example, polyhydric alcohols, amines, aminoalcohols or even water. As examples of such suitable chain-extenders there may be mentioned, for example, ethylene glycol, 1,4-butane diol, 1,6-hexane diol, ethanolamine, ethylene diamine, N-methyl diethanolamine, water and the like.

Further examples of starting components which may be used to prepare the polyurethane dispersions can be found in German Auslegeschrift No. 1,237,306 and in Belgian patent specifications No. 673,432, 653,223 and 668,299.

Anionic polyurethane dispersions of the type described, for example, in German Auslegeschrift No. 1,237,306, and in Belgian patent specifications No. 673,432; 653,223 and 668,299, are particularly suitable for use in the process according to the invention. Emulsifier-free dispersions of anionic polyurethanes with alkali metal carboxylate, sulphonate, phosphonate or phosphinate groups are particularly preferred.

The processes normally used to prepare aqueous emulsifier free anionic polyurethane dispersions such as, for example, as disclosed in German Auslegeschrift No. 1,237,306 and Belgian patent specifications No. 673,432; 653,223 and 668,299, may be used to prepare dispersions of polyurethanes with anionic salt groups in which the polyvinyl chloride stabilizers are present in solution in the dispersed phase. One feature which these processes have in common is that solutions of polyurethanes in organic solvents are mixed with the water used in the form of a continuous dispersion phase, accompanied by dispersion. The organic solvent is subsequently removed from these solvent-containing dispersions, for example, by distillation or by blowing out, optionally at elevated temperature, or in vacuo.

According to this invention, the polyvinyl chloride stabilizers are added to the polyurethane dispersion mixture, preferably in or during a process stage before the solution of the polyurethane in an organic solvent is combined with the water used for dispersion. Thus, the stabilizer may be added to a preadduct containing isocyanate groups, or to the reaction mixture during preparation of the polyurethane. If the stabilizer contains groups with reactive hydrogen atoms which react with isocyanate groups, the stabilizer will only be added to the reaction mixture used to prepare the polyurethane upon completion of the isocyanate polyaddition reaction which is accompanied by chain formation. The product suitable for stabilizing the vinyl or vinylidene chloride polymers is preferably added to the reaction mixture in the form of an organic solution upon completion of the isocyanate polyaddition which is accompanied by chain formation. The calculated quantity of water required for dispersion is then added, accompanied by dispersion, and the organic solvents used to dissolve the preadduct containing isocyanate groups, or the polyurethane and the stabilizers, are removed, optionally in vacuo, by distillation or by blowing out. In general, the dispersions are adjusted to a solids content of from about 20% to about 60% by weight, and preferably from about 30% to about 50% by weight.

The polyvinyl chloride stabilizers are normally added in any stabilizing amount, generally in a quantity of from 0.1% to 20% by weight, and preferably in a quantity of from 0.5% to 6% by weight, based on the solid polyurethane.

In order to work the stabilizers into the polyurethane dispersion, it is particularly preferred to use those stabilizers which are adequately soluble or finely dispersible in the polyurethanes used, but which, on the other hand, are insoluble or largely insoluble in water, so that they cannot be washed out of the dispersed polyurethane dispersion particles. It is also of an advantage if the stabilizers employed are adequately soluble in organic solvents so that they may readily be worked into the solvent-containing polyurethane mixtures.

The polyvinyl chloride stabilizers used are generally known and may be prepared by known methods. Water-insoluble polyvinyl chloride stabilizers soluble in organic solvents advantageously used for the process according to the invention, include, for example, organic phosphites, epoxides, such as, for example, epoxidized soya oils and oleic acid esters, sulphur-containing and sulphur-free organotin compounds, alkylated phosphoric acid amides, β-aminocrotonic acid esters, phenols, thioureas, indoles, organic bases, and orthoesters. In addition, the usual metal soaps stabilizers, such as, for example, those of lithium, magnesium, calcium, zinc, barium, cadmium or mixtures thereof, and the basic sulphates, phospites, carbonates and silicates of lead, may also be used in finely dispersed form.

The following are mentioned as some of the specific individual stabilizers that may be employed in the process of the invention:

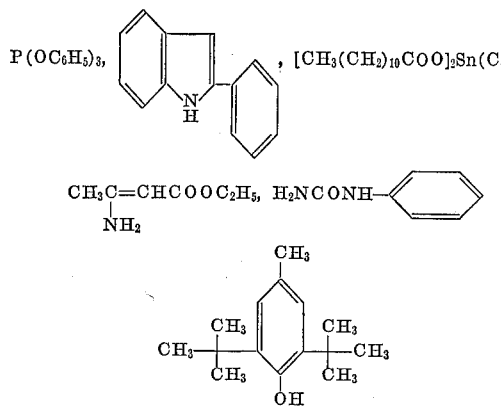

P(OC$_6$H$_5$) (iso-C$_9$H$_{19}$)$_2$, barium/cadmium laurate, calcium/zinc stearate, magnesium stearate,

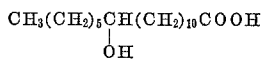

and

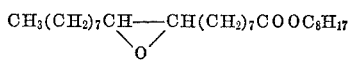

Further additional examples of polyvinyl chloride stabilizers suitable for the purposes of this invention are disclosed in "Stabilisierung de Kunststoffe gegen Licht und Warme," by J. Voigt, Springer-Verlag (1966) pages 187–397 and 429–447.

In most instances, it is of advantage to combine several polyvinyl chloride stabilizers with one another in order to inhibit all types of degradation and aging phenomena, such as the degradation reactions initiated by heat, light and oxidation, including the elimination of hydrogen chloride and the formation of double bonds, and which render harmless the reaction products formed by degradation.

As examples of dispersions of vinyl or vinylidene chloride polymers that may be used in accordance with this invention include dispersions of polyvinyl chloride, polyvinylidene chloride or copolymers of vinyl chloride and/or vinylidene chloride and vinyl acetate and other olefinically unsaturated polymerizable monomers known in the art. Dispersions of polyvinyl butyral may also be used. Suitable vinyl chloride polymers are prepared, for example, by emulsion polymerization. The aqueous latices formed may be directly used for the process according to the invention.

The vinyl chloride polymer dispersions and the polyurethane dispersions may readily be mixed with one another. The usual diluents, fillers, pigments, dyes and conventional plasticizers may additionally be incorporated. As a rule, the weight ratio of inert vinyl chloride polymers to polyurethanes is from about 49:1 to about 1:49 and preferably from about 2:1 to about 1:2.

The dispersed plastics mixture of this invention is coagulated by the addition of electrolytes, such as inorganic salts, for example, ammonium chloride, sodium sulphate, sodium chloride, potassium chloride, calcium chloride or alum, to the latex mixture or by stirring the latex mixture into an aqueous electrolyte solution, optionally at elevated temperature. The coagulate is then suction-filtered, washed and dried.

The plastics mixtures thus obtained are thermoplastic and may be processed by the methods conventionally used for thermoplastic plastics. For example, they may be formed by molding, transfer molding, injection molding, extrusion or calendering.

Even where the products of this invention contain 50% by weight of vinyl chloride polymer, the products are elastomeric and show outstanding low temperature properties.

The products obtained by the process can be employed for the manufacture of, for example, films, foils, coatings, sections, hoses and soling material.

The invention is further illustrated but is not intended to be limited by the following examples in which all parts and percentages are by weight unless otherwise specified.

EXAMPLES (A) Starting material used in accordance with the invention

The anionic polyurethane latices described in the following may be used for the process according to the invention.

Polyurethane latex I.—A mixture of about 167 parts of adipic acid/ethylene glycol polyester (OH number 56) and 283 parts of adipic acid/1,6-hexane diol/neopentyl glycol polyester (molar ratio 32:22:12, OH number 67) is dehydrated for about 30 minutes at about 120° C. and reacted for about 2 hours at about 120° C. with about 72 parts of 1,6-hexane diisocyanate. After cooling to about 60° C., the melt is taken up in about 1400 parts by volume of acetone, and a solution of about 14.1 parts of potassium lysinate in about 160 parts by volume of water is added to it. After brief stirring, a solution of about 10.7 parts of α-phenylindole as stabilizer and about 10.7 parts of glyceryl mono-oleate as lubricant in about 100 parts by volume of acetone is added. About 750 parts by volume of water are then introduced, after which the acetone is distilled off in a water jet vacuum at about 45° C. to 50° C. The resulting acetone-free latex has a solids content of about 40.1% and is storage-stable for prolonged periods without forming any sediment.

Polyurethane latex II.—The procedure is the same as that described in the preparation of polyurethane latex I, except that about 10.7 parts of ethyl β-aminocrotonate are used as stabilizer and about 10.7 parts of montan wax as lubricant in about 100 parts by volume of methanol and about 300 parts by volume of benzene. The resulting about 39.7% latex is stable and may be directly used as such in the manner according to the invention.

Polyurethane latex III.—The procedure adopted is the same as that described to prepare polyurethane latex I, except that a solution of about 10.7 parts of terephthalic acid monoester monohydrazide in about 50 parts by volume of acetone is used as stabilizer. The resulting 42.0% latex is stable and has a residual acetone content of about 0.5%.

Polyurethane latex IV.—The procedure adopted is the same as that adopted to prepare polyurethane latex I, except that a solution of about 21.4 parts of an epoxidized soya oil is added as pre-stabilizer. The resulting about 39.8% latex remains perfectly stable when stirred.

Polyurethane latex V.—The procedure is the same as that adopted in the preparation of polyurethane latex I, except that a solution of about 10.7 parts of diisononylphenyl phosphite in about 50 parts by volume of acetone is added. The resulting about 39.2% latex is acetone-free, can be stored for at least about 6 months without depositing a sediment, and shows a Tyndall effect.

Polyurethane latex VI.—The procedure adopted is the same as that adopted to prepare polyurethane latex I, except that no stabilizers or lubricants are present. The resulting stabilizer- and lubricant-free latex has a solids content of about 40.3% and is used for the comparison tests.

(B) Process according to the invention

The anionic polyurethane latices I to VI, each having a solids content of about 40% are mixed with a polyvinyl chloride dispersion of similar concentration in such a way that after precipitation the polyurethane/polyvinyl chloride weight ratio is about 1:1. The mixture is coagulated at room temperature with an approximately 5% solution containing equal weights of sodium chloride and calcium chloride. After washing, the coagulate is dried at a low temperature of up to about 40° C.

In order to test their stability, the mixtures are homogenized for ten minutes on mixing rolls heated to about 165° C. and then assessed. The rough sheets are then stored at about 170° C. in a recirculating-air heating cabinet. The discoloration occurring after various time intervals is used to assess thermal stability.

Tests were conducted on (all additions relate to the polyurethane solids content):

Example 1: Polyurethane latex I with 2% of α-phenolindole as stabilizer and 2% of glyceryl mono-oleate as lubricant.

Example 2: Polyurethane latex II with 2% of β-aminocrotonic acid ester as stabilizer and 2% of montan wax as lubricant.

Example 3: Polyurethane latex III with 2% of terephthalic acid monoester monohydrazide as stabilizer.

Example 4: Polyurethane latex IV with 4% of an epoxidized soya oil as pre-stabilizer.

Example 5: Polyurethane latex V with 2% of an diisononylphenyl phosphite as pre-stabilizer.

The following was used by way of comparison:

Example 6: Polyurethane latex VI of similar composition without any additives.

RESULT.—EXAMPLE 1

A mixture obtained as described above from polyvinyl chloride and polyurethane latex I gives a rough sheet which is almost colorless. If, by contrast, a mixture of polyvinyl chloride and polyurethane latex VI is converted into a rough sheet and the stabilizers, 2% of α-phenylindole and 2% of glyceryl mono-oleate, are added on the mixing rolls, this rough sheet turns yellow in color.

EXAMPLE 2

In this case, too, the 10 minute rough sheet of polyvinyl chloride with polyurethane latex II is colorless while the rough sheet of polyvinyl chloride and polyurethane latex VI turns deep yellow in color following introduction of the additives, 2% of β-aminocrotonic acid ester and 2% of montan wax on the mixing rolls.

EXAMPLE 3

The same results as set forth in Examples 1 and 2 are observed when a rough sheet of polyvinyl chloride and polyurethane latex III is prepared.

EXAMPLE 4

After 10 minutes, the polyvinyl chloride mixture with polyurethane latex IV gives a colorless rough sheet which only turns brown in color after storage for 45 to 60 minutes in a heating cabinet. By way of comparison, a rough sheet obtained from the mixture with polyurethane latex VI shows marked discoloration after only 30 minutes. If 2% of a Ca/Zn soap are additionally added to this mixture, discoloration only occurs after some 75 minutes. Following the addition of 2% of α-phenylindole, there is no discoloration for 120 minutes. The highly synergistic effect of the epoxide stabilizer is clearly noticeable.

EXAMPLE 5

In combination with a Ba/Cd or Ca/Zn soap, the polyvinyl chloride mixture with polyurethane latex V yields, after 10 minutes, colorless rough sheets which show outstanding stability to heat when stored for prolonged periods in heating cabinets, so that in this instance too there is clear evidence of a marked synergistic stabilizing effect.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. In the process for the production of homogeneous, thermoplastic compositions containing stabilizers, comprising mixing as aqueous polymer dispersion selected from the group consisting of vinyl or vinylidene chloride polymer dispersions, with an aqueous dispersion of a polyurethane polymer, followed by coagulation and forming of the polymeric composition, the improvement consisting of adding at least one polyvinyl chloride stabilizer in solution or fine distribution to the aqueous dispersion of the polyurethane polymer or to the reaction mixture during preparation of the polyurethane polymer, prior to the mixing of the two aqueous polymer dispersions.

2. The process of claim 1 wherein the polyurethane of the aqueous polyurethane dispersion is obtained by the reaction of a polyhydroxyl compound having a molecular weight of from 400 to 4000 with an organic polyisocyanate selected from the group consisting of an aliphatic or aralipahtic polyisocyanate.

3. The process of claim 2 wherein the reaction to form the polyurethane of the aqueous polyurethane dispersion includes in the reaction mixture a chain-extending agent having reactive hydrogen atoms and a molecular weight of less than 400.

4. The process of claim 2 wherein the polyvinyl chloride stabilizer is added to the polyurethane in an organic solution.

5. The process of claim 4 wherein the polyvinyl chloride stabilizer is added to the polyurethane dispersion mixture before the solution of the polyurethane is combined with the water used for dispersion.

6. The process of claim 5 wherein the polyvinyl chloride stabilizer is added to the reaction mixture during preparation of the polyurethane.

7. The process of claim 5 wherein the polyvinyl chloride stabilizer is added to the polyurethane reaction mixture after completion of the isocyanate polyaddition reaction.

8. The process of claim 2 wherein the aqueous dispersion of polyurethane contains from 0.1% to 20% by weight of a polyvinyl chloride stabilizer based on the weight of solid polyurethane.

9. The process of claim 2 wherein the polyvinyl chloride stabilizer is soluble in the polyurethane and largely insoluble in water.

References Cited

UNITED STATES PATENTS 3,438,940   4/1969   Keberle et al. _____ 260—29.6 X

DONALD E. CZAJA, Primary Examiner

D. J. BARRACK, Assistant Examiner

U.S. Cl. X.R.

260—23 X A, 29.6 R, 29.6 N R, 45.7 P, 45.7 S, 45.75 R, 45.75 K, 45.8 A, 45.8 N, 45.85, 45.9 R, 45.95, 77.5 C R, 859 P V